United States Patent
Lebsack et al.

(10) Patent No.: US 7,160,184 B1
(45) Date of Patent: Jan. 9, 2007

(54) CONVEYOR SYSTEM WITH PIVOTABLE HOOKS

(75) Inventors: Kenneth L. Lebsack, Ankeny, IA (US);
Brent R. Schirm, Norwald, IA (US);
Michael J. Hardy, West Des Moines, IA (US); Kenneth B. Arnote, Albion, IA (US); David W. Alexander, Boone, IA (US)

(73) Assignee: Stork Townsend Inc., Des Moines, IA (US)

( * ) Notice: Subject to any disclaimer, the term of this patent is extended or adjusted under 35 U.S.C. 154(b) by 0 days.

(21) Appl. No.: 11/160,841

(22) Filed: Jul. 12, 2005

(51) Int. Cl.
*A22C 11/00* (2006.01)

(52) U.S. Cl. ..................................... 452/177

(58) Field of Classification Search ............... 226/105, 226/107, 173, 106; 452/177, 51, 31, 183
See application file for complete search history.

(56) References Cited

U.S. PATENT DOCUMENTS

| | | | |
|---|---|---|---|
| 4,761,854 A * | 8/1988 | Schnell et al. | 452/51 |
| 5,163,864 A * | 11/1992 | Burger et al. | 452/51 |
| 6,056,630 A | 5/2000 | Cody et al. | |
| 6,257,974 B1 | 7/2001 | Basile, II | |
| 6,277,018 B1 * | 8/2001 | Cody et al. | 452/51 |
| 6,467,668 B1 * | 10/2002 | Basile et al. | 226/104 |
| 6,523,462 B1 * | 2/2003 | Johnson et al. | 99/443 C |
| 6,592,452 B1 * | 7/2003 | Myers | 452/51 |
| 6,786,321 B1 * | 9/2004 | Borkiewicz et al. | 198/419.3 |

* cited by examiner

*Primary Examiner*—Thomas Price

(57) ABSTRACT

A conveyor system for linked sausage strands having a frame with an operating platform. The platform has opposite first and second ends, opposite sides, a top surface, and a wall extending along the sides and ends. A channel is formed in the top surface and a conveyor chain is disposed within the channel. Secured to the chain are a plurality of pivotable hooks that are movable between a loading position and an unloading position.

7 Claims, 4 Drawing Sheets

CONVEYOR SYSTEM WITH PIVOTABLE HOOKS

BACKGROUND OF THE INVENTION

Conveyors have been used in conjunction with sausage making machines. The conveyors generally have a horizontally disposed conveyor chain suspended on a frame with hook elements extending outwardly therefrom to receive loops of an encased sausage strand. One example is shown in U.S. Pat. No. 6,467,668 incorporated by reference herein in its entirety. The hooks move forward to an unloading area where the looped sausage strand is manually unloaded onto a smoke stick.

Several disadvantages are present with current conveyors. First, because they are manually unloaded, the process is labor intensive and more costly. Second, it is difficult to change or vary product spacing on the smoke stick to maximize smokestick loading and prevent blemishes from developing on the strand that results from contact. Accordingly, a need exists in the art for an improved conveyor system.

Therefore, a principal objective of the present invention is to provide a conveyor system that automatically unloads a looped strand of sausage.

A further object of the present invention is to provide a conveyor system that is more cost effective to use.

A still further objective of the present invention is to provide a conveyor system that easily and quickly changes product spacing on a smoke stick.

Another objective of the present invention is to provide a conveyor system having a plurality of pivotable hooks.

These and other objectives will be apparent to one skilled in the art based on the following written description.

SUMMARY OF THE INVENTION

A conveyor system for linked sausage strands having a frame with an operating platform. The platform has opposite first and second ends, opposite sides, a top surface, and a wall extending along the sides and ends. A channel is formed in the top surface and a conveyor chain is disposed within the channel. Secured to the chain are a plurality of pivotable hooks that are movable between a loading position and an unloading position.

DESCRIPTION OF THE PREFERRED EMBODIMENT

Figure 1:
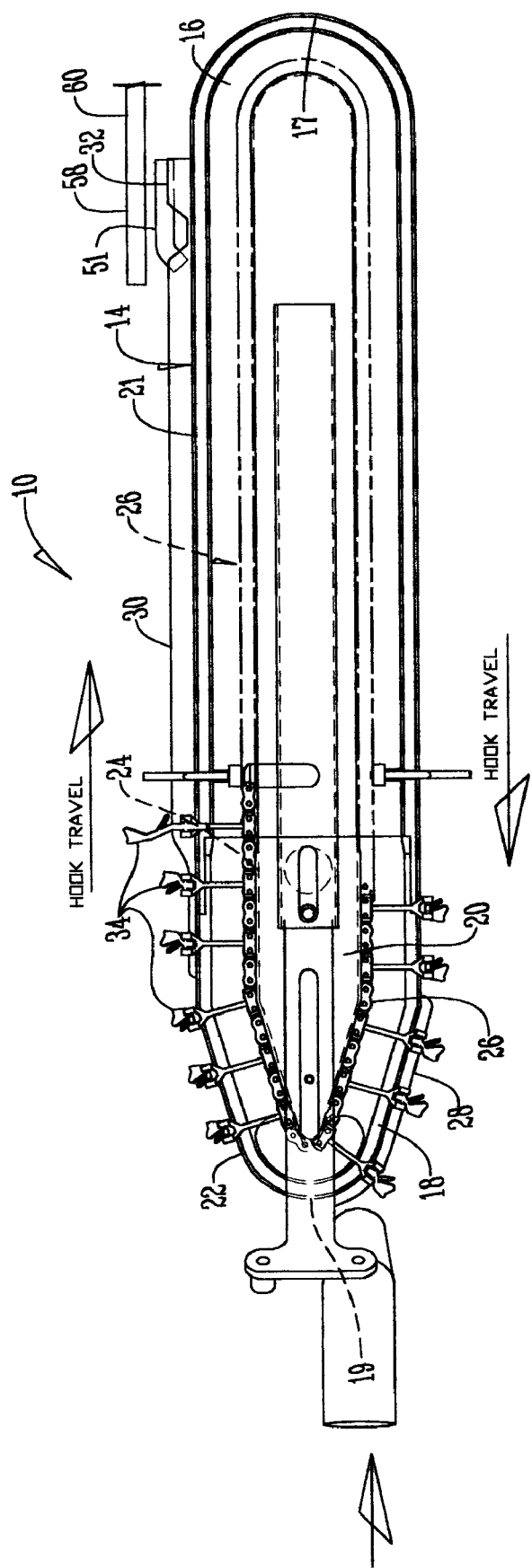
FIG. 1 is a plan view of a conveyor.
Figure 2:
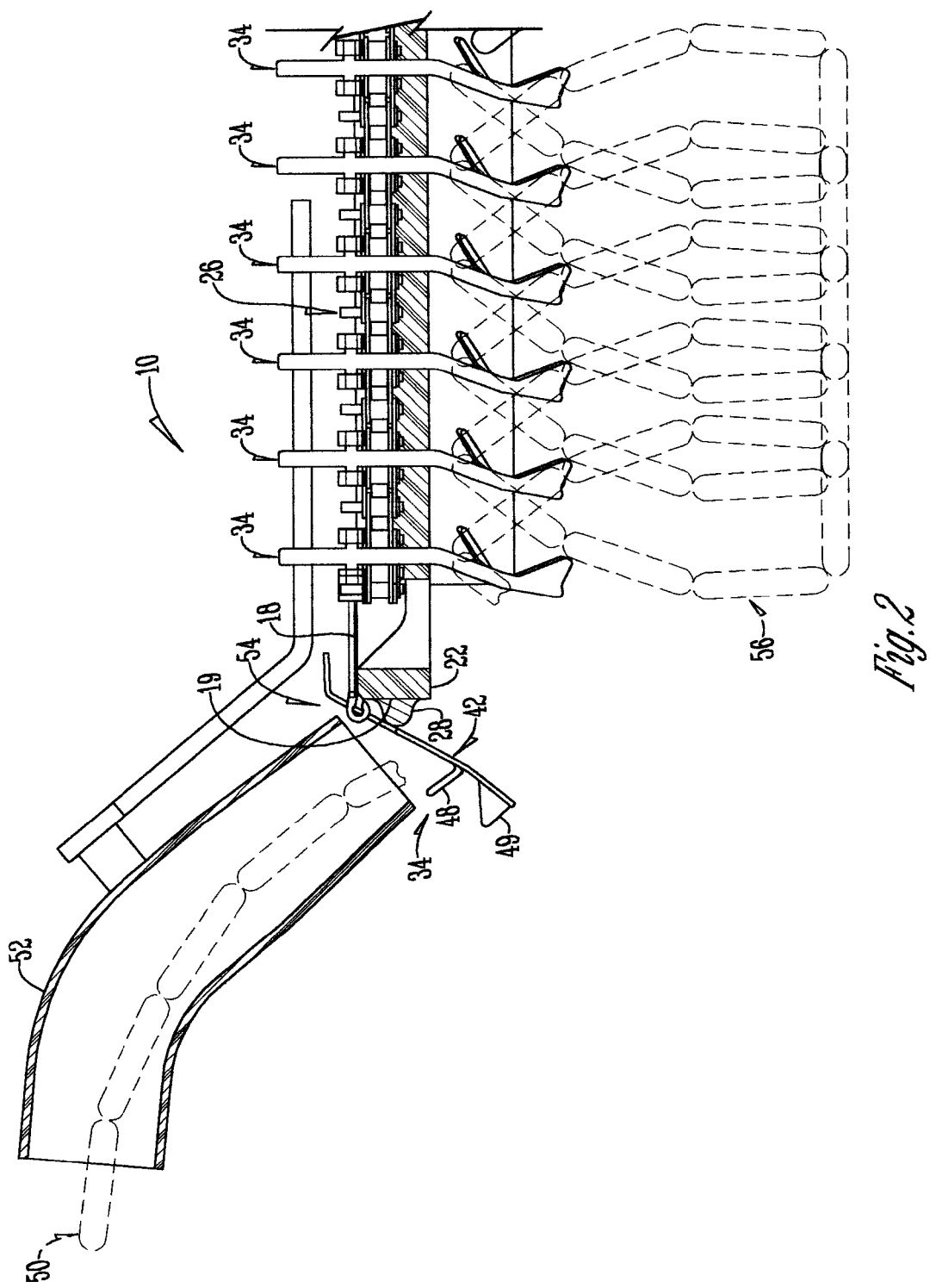
FIG. 2 is a side view of a conveyor.

A conveyor assembly 10 has an operating platform 12 which has an outer perimeter wall 14. The platform 12 has end 16, a second or forward end 18, and a frame member 20 which supports wall 14. The wall 14 and platform 12 are preferably comprised of plastic.

The wall 14 has a semi-circular wall portion 17 around end 16; a smaller semi-circular wall portion 19 around forward end 18; parallel spaced sidewall portions 21 extending forwardly from wall portion 17; and converging diagonal wall portions 22 which extend from sidewall portions 21 to wall portion 19.

A channel 24 is attached to frame member 20 in spaced relation to wall 14. A continuous conveying chain 26 is slidably mounted in channel 24 and is powered in any convenient manner such as by an electric motor (not shown) to move the chain in channel 24.

Directly mounted to wall portions 19 and 22 is an end guide rail 28 that tapers outwardly from wall 14 as the end guide rail 28 extends from wall portion 22 and toward semi-circular wall portion 19. Directly mounted along side portion 21 of wall 14 is a side guide rail 30 that tapers outwardly from wall 14 as the guide rail 30 extends from the forward end 18 toward end 16. Also, mounted directly to the side portion 21 of wall 14 near end 16 is a cam guide 32.

A plurality of pivotable hooks 34 are secured to the chain in any convenient manner. The hooks 34 are preferably comprised of an elongated shank 36 which has an inner end connected to the chain, and an outer end that extends beyond wall 14 and terminates in a pair of partially arcuate portions 38 that curve back toward the elongated portion of the shank leaving a space or opening 40 therebetween. A hook portion 42 fits within the arcuate portions 38 and has an upper section 44 that extends above the shank 36, a transverse section 45 that pivotably fits within the inner surface of the arcuate portions 38, and a lower section 46, that extends below the shank. The lower section 46 preferably has a mounting stem 48 that extends outwardly from the lower section 46 and an angled separating flange 49 at the end. Mounted to the assembly 10 below the platform 14 and near the cam guide 32 is a guide bar 51 that preferably has an angled transverse section and a generally longitudinal section.

An elongated strand 50 of linked sausage is delivered through conventional horn 52 of a sausage encasing and linking machine whereupon the strand flows into the path of the hooks 34 which are moving past the loading station 54 at end 18. Loops 56 of linked sausages are deposited on the mounting stem 48 of the hooks 34 as they leave the forward end 18.

Figure 3:
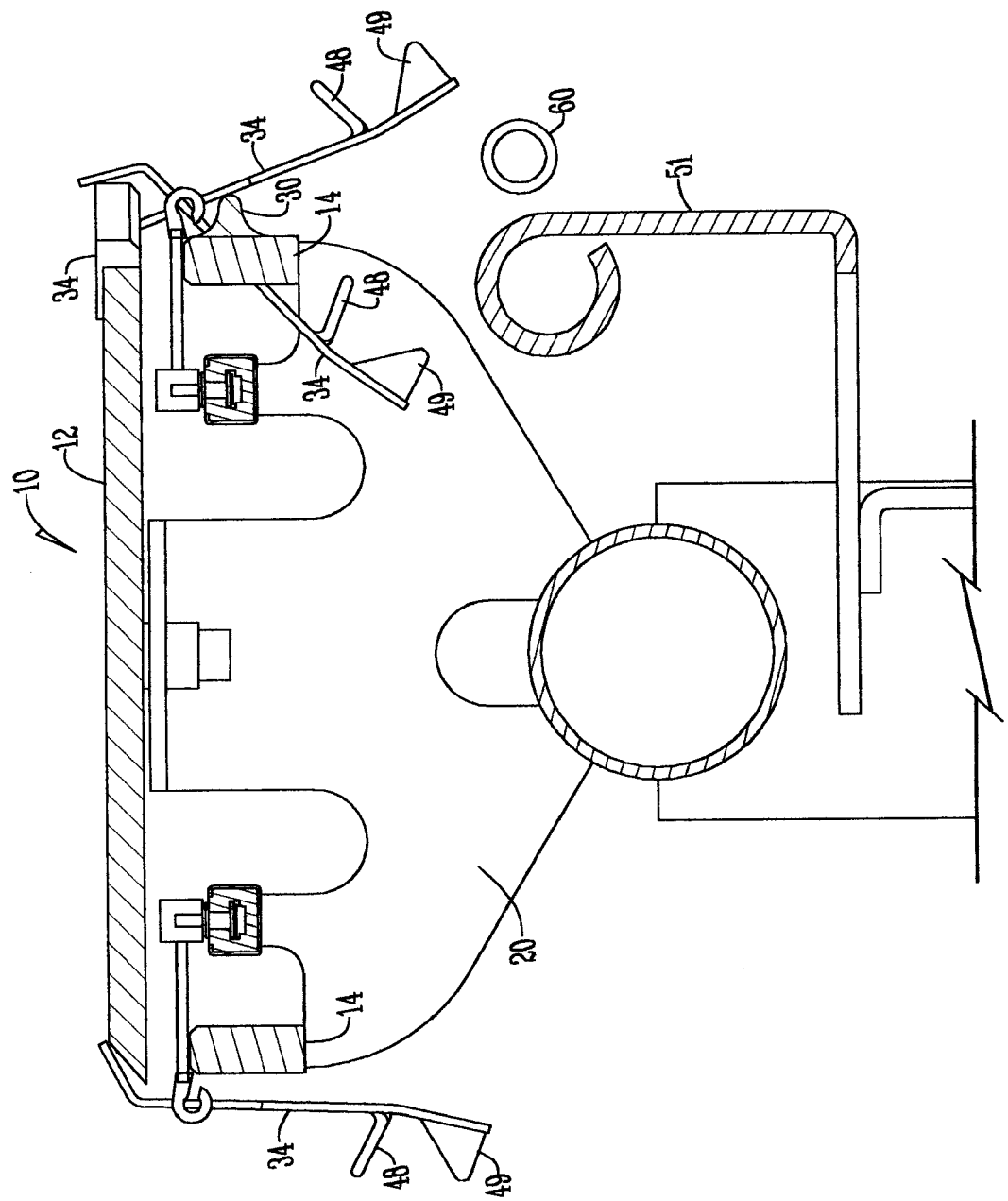
FIG. 3 is an end view of a conveyor.
Figure 4:
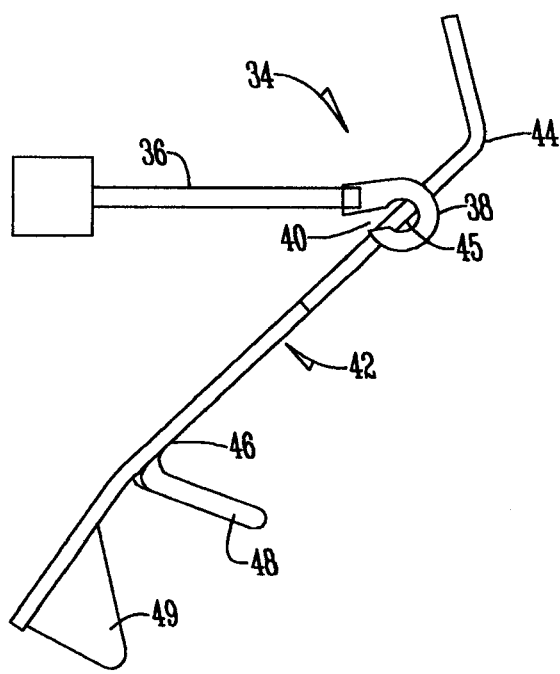
FIG. 4 is a side view of a pivotable hook.
Figure 5:
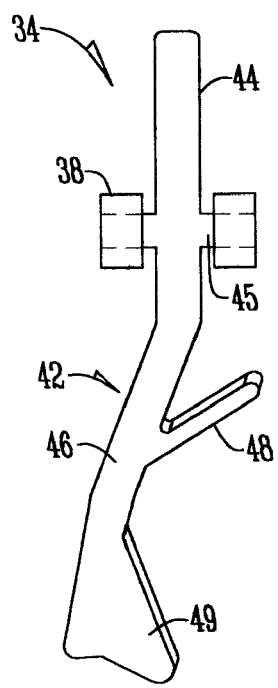
FIG. 5 is an end view of a pivotable hook.

To assist in loading the loops 56, as the hooks 34 travel toward the loading station 54, they are moved to a loading position as the lower section 46 of the hook portion 42 engages end guide rail 28 a shown in FIG. 3. In the loading position the lower section 44 extends outwardly from wall 14. After the strand 50 has been loaded on the hooks 34 the hooks are preferably dropped momentarily to a neutral position when rail 28 no longer engages the lower section 46 of the hook portion 42. In the neutral position, the hook portion 42 hangs in a generally vertical plane. By dropping the hook portion 42 momentarily to a neutral position the product orientates in one spot on the mounting stem 48.

As the loaded hooks 34 move from the forward end 18 toward end 16 the lower section 44 of the hook portion 42 engages side guide rail 30 to return the hooks to the loading position. This increases distance between sausages for ease of loading. The hooks 34 preferably stay in this position until they reach the unloading station 58 and the loops 56 are automatically unloaded onto a stick 60. At the unloading station, side guide rail 30 no longer engages the hooks 34, and instead cam guide 32 engages the upper section 44 of the hook portion 42 to move the hook 34 to an unloading position. In the unloading position the upper section 44 of the hook portion extends outwardly from wall 14. A hook 34 pivots to the unloading position the strand 56 engages stick 60 and guide bar 51 such that the strand 56 is pushed off the hook 34 by guide bar 51 and automatically and falls onto the stick 60.

It is therefore seen that this invention will accomplish all of its stated objectives.

What is claimed is:

1. A conveyor system for linked sausage strands, comprising:
    a frame member having an operating platform with opposite first and second ends, opposite sides, a top surface, and a wall extending along the sides and first and second ends;
    a channel in the frame member having a continuous conveyor chain in the channel,
    a plurality of spaced pivotable hooks secured to a conveyor chain; and
    a side guide rail mounted directly to the wall.

2. The system of claim 1 wherein the side guide rail engages the plurality of hooks to move the hooks to a loading position as the hooks are transported from a loading station to a discharge station.

3. The system of claim 1 further comprising an end guide rail mounted directly to the wall adjacent a loading station.

4. The system of claim 3 wherein the end guide rail engages the plurality of hooks to move the hooks to a loading position.

5. The system of claim 4 wherein the hooks are momentarily dropped to a neutral position after the hooks are loaded.

6. The system of claim 1 further comprising a cam guide mounted directly to the wall adjacent a discharge station.

7. The system of claim 6 wherein the cam guide engages the hooks to move the hooks to an unloading position.

\* \* \* \* \*